United States Patent [19]
Hong

[11] Patent Number: 5,957,797
[45] Date of Patent: *Sep. 28, 1999

[54] AUTOMATIC CHANGE TRANSMISSION UTILIZING CONTINUOUS ELASTIC DRIVE BELT AND METHOD

[75] Inventor: Shane Yuan Hong, Centerville, Ohio

[73] Assignee: Wright State University, Dayton, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/706,528

[22] Filed: Sep. 4, 1996

[51] Int. Cl.$^6$ .............................. F16H 7/00; F16G 1/28
[52] U.S. Cl. ........................................ 474/148; 474/205
[58] Field of Search .................... 474/202, 204, 474/205, 239, 152, 153, 161, 148, 150

[56] References Cited

U.S. PATENT DOCUMENTS

| | | | |
|---|---|---|---|
| 254,089 | 2/1882 | Briggs | 474/239 |
| 375,308 | 12/1887 | Arnao, Jr. | 474/239 |
| 386,335 | 7/1888 | Midgley | 474/239 |
| 924,324 | 6/1909 | Dalton | 474/239 |
| 1,214,911 | 2/1917 | Grantz . | |
| 1,371,513 | 3/1921 | Nicherson | 474/239 |
| 1,586,353 | 5/1926 | Colegrove | 474/239 |
| 2,251,772 | 8/1941 | Zuber | 474/239 |
| 2,307,192 | 1/1943 | Boege | 474/239 |
| 3,083,582 | 4/1963 | Wheller . | |
| 3,599,504 | 8/1971 | Taylor . | |
| 3,599,505 | 8/1971 | Logan et al. . | |
| 3,851,536 | 12/1974 | Zelchman . | |
| 3,881,316 | 5/1975 | Bunda et al. . | |
| 4,078,443 | 3/1978 | Warner et al. . | |
| 4,229,985 | 10/1980 | Borello . | |
| 4,229,988 | 10/1980 | Rattunde . | |
| 4,494,946 | 1/1985 | Wilcox . | |
| 4,559,029 | 12/1985 | Miranti, Jr. et al. . | |
| 4,589,858 | 5/1986 | Gaddi . | |
| 4,706,800 | 11/1987 | Davidson . | |
| 4,770,065 | 9/1988 | Woyton . | |
| 5,181,890 | 1/1993 | Robecchi . | |
| 5,346,439 | 9/1994 | Lynch . | |
| 5,405,299 | 4/1995 | Kabo et al. | 474/205 |
| 5,662,541 | 9/1997 | Rooves | 474/205 |

*Primary Examiner*—Charles A Marmor
*Assistant Examiner*—Matthew A. Kaness
*Attorney, Agent, or Firm*—Killworth, Gottman, Hagan & Schaeff, L.L.P.

[57] ABSTRACT

Methods and apparatus change speeds between a drive shaft and a driven shaft during power transmission between the shafts. Fixed diameter drive and driven wheels are secured to the shafts and a continuous elastic belt interconnects the drive wheel and the driven wheel. As power is transmitted between the shafts, one side of the elastic belt extending between the wheels is placed in tension and elongated in proportion to the tension while the other side of the elastic belt is untensioned and not elongated. The elongated portion of the belt remains elongated as it passes around the wheel which is driving and the slack portion of the belt remains relaxed as it passes around the wheel which is being driven. To accommodate the elongated state of the belt, the driving wheel must go faster than the driven wheel with the speed difference being dependent upon the amount of power being transmitted between the wheels and hence the amount of elongation of the elongated portion of the belt. Preferably, the elastic belt has ribs which are separated by substantially constant distances for the relaxed separated by distances which vary in proportion to the tension placed on the tensioned portion of the belt. To reduce slippage of the belt as power is transmitted between the wheels, axial grooves sized to receive the ribs are formed around the periphery of the wheels.

8 Claims, 4 Drawing Sheets

AUTOMATIC CHANGE TRANSMISSION UTILIZING CONTINUOUS ELASTIC DRIVE BELT AND METHOD

BACKGROUND OF THE INVENTION

The present invention relates in general to transmissions for automatically changing speeds of vehicles or machinery and, more particularly, to a new design for a greatly simplified automatic transmission which can be used in a wide variety of applications including bicycles, lawn and garden equipment, tractors, motorcycles, automobiles, and other machinery for effecting automatic speed changes as power is transmitted to a load which is driven manually, by an electric motor or by an internal combustion engine. More particularly, a fixed diameter drive wheel affixed to a drive shaft is coupled to a fixed diameter driven wheel affixed to a driven shaft by an elastic drive belt for automatic changes in speed of the drive shaft relative to the driven shaft as power is transmitted between the two shafts.

Conventionally, speed changes in machinery are performed by transmissions wherein the changes are performed by changing radius ratios of drive wheels and driven wheels, i.e., pulleys, sprockets, gears and the like. Changing the radius ratios increases or decreases the speed of a driven wheel for a given speed of the drive wheel and, conversely, decreases or increases the torque applied to the driven wheel. Due to varying load conditions, it is often desirable to adjust the radius or speed ratios so that the torque load on the power source, whether a person, motor or engine, is within the capacity for efficient operation of the power source. One such situation exists for acceleration of a vehicle to a desired speed from a standing start.

Manual transmissions permit changes of radius ratios or gears to accomplish speed/torque control. Manual transmissions permit an operator of a machine to manually select the radius ratios or gears and permit operators to control operating speeds of a machine manually. Manual transmissions, while less popular in recent years, are still common in motor vehicles, particularly in trucks, and are almost universal in bicycles where the most common gear shifters comprise derailleur systems which move a chain among a series of two or more adjacent sprockets.

The most popular transmission in motor vehicles in the United States is the automatic transmission which automatically shifts gears within the transmission. The automatic transmission includes three major components: a torque converter, at least one planetary gear system, and a hydraulic control system. The torque converter is a hydraulic coupler composed of an impeller or pump and a turbine, plus a stator to multiply the torque. The torque converter is essential to the automatic transmission because it provides smooth clutching between the engine and the transmission gears. However, it is also the main source of inefficiency within the transmission.

A planetary gear system is composed of a sun gear, planet-pinions and an internal gear. The planetary gear system can provide an increase in speed with a decrease in torque, a decrease in speed with an increase in torque, or provide for changes between reverse, neutral and direct drive by locking one or more gearing members. More than one planetary gear set is often used in an automatic transmission to provide additional speed ratios. While gears are the most efficient power transmission elements, they have high precision requirements, are expensive to manufacture and generate noise in operation.

The hydraulic control system of a conventional automatic transmission comprises numerous components such as governors, servo bands, clutches, check valves, balance valves, modulator valves, pressure regulator valves and the like to control the transmission in response to sensed speed and throttle pressure. The hydraulic control system controls the shifting of the gears by either locking one or more of the sun gears or planet-pinions, or by activating servo bands or clutches. Thus, the hydraulic control system adds to the complications and expense of the conventional automatic transmission used in today's motor vehicles. In addition to the noted complexities, conventional automatic transmissions produce substantial amounts of heat and must be cooled for proper operation.

In summary, conventional automatic transmissions as used in many modern day motor vehicles are complicated, expensive, require substantial cooling and, upon failure, are expensive to repair.

Another form of automatic transmission is the variable-speed drive. Variable-speed drives provide an infinite number of speed ratios within a specific range, and may be made in the form of a cone drive, disk drive or belt drive. The belt drive is the most common variable-speed drive design with the variable speed ratios being achieved by changing the effective diameters of two pulleys. The pulleys are made of two flanges to fit a V-belt. One flange is fixed, and the other flange is adjustable in an axial direction. The separation of the two flanges changes the effective diameter of the pulley to the V-belt. While one pulley opens the flanges to reduce the effective diameter of that pulley, the other pulley pulls the flanges closer together to increase the effective diameter of that pulley. Then the speed ratio of the two pulleys reflects the new ratio of the effective diameters.

Some automatic transmissions using variable-speed drives have been developed and used on motorcycles, garden and farm equipment, as well as some small automobiles. In operation, the variable-speed drive automatic transmissions adjust the pulley widening and closing by electrical, hydraulic or mechanical means. In general, the torque or speed of a driven or driving pulley is sensed and then the flange gaps of the two pulleys are synchronously adjusted. Unfortunately, variable-speed drives primarily rely on friction between the pulley and the V-belt such that frictional losses are unavoidable, the tension of the belt must be accurately controlled by springs or linkage-controlled pulleys, there is a limitation of load capacity and slippage can not be completely avoided. Accordingly, variable-speed drives do not present a viable solution to the problems of conventional automatic transmissions.

It is, thus, apparent that there is a need for improved automatic transmission designs to improve upon existing technology and to provide alternatives for designers in the many industries using automatic transmissions. Preferably, such improved designs would be simple, inexpensive and provide high reliability.

SUMMARY OF THE INVENTION

This need is met by the invention of the present application wherein methods and apparatus are provided for changing speeds between a drive shaft and a driven shaft during power transmission between the drive shaft and the driven shaft. Fixed diameter wheels are secured to the drive shaft and the driven shaft and a continuous elastic belt interconnects the drive wheel and the driven wheel. As power is transmitted between the wheels, one side of the elastic belt extending between the wheels is placed in tension and is elongated proportionally while the other side of the elastic belt is relaxed, untensioned and slack such that it is not elongated. The elongated portion of the belt remains in its elongated state as it passes around the wheel which is driving and the slack portion of the belt remains in its relaxed state as it passes around the wheel which is being driven. To accommodate the elongated state of the belt, the driving wheel must go faster than the driven wheel with the speed difference being dependent upon the amount of power and load being transmitted between the wheels and hence the amount of elongation of the elongated portion of the belt. Preferably, the elastic belt has ribs which are separated by substantially constant distances for the relaxed portion of the belt but for the tensioned portion of the belt are separated by distances which vary in proportion to the tension placed on that portion of the belt. To reduce slippage of the belt as power is transmitted between the wheels, axial grooves sized to receive the ribs are formed around the periphery of the wheels.

In accordance with one aspect of the present invention, apparatus for transmitting power from a drive shaft to a driven shaft comprises a drive wheel having a fixed diameter and being affixed to the drive shaft, a driven wheel having a fixed diameter and being affixed to the driven shaft, and a continuous elastic drive belt connecting the drive wheel and the driven wheel. To reduce slippage, preferably the drive wheel and the driven wheel include axially aligned grooves formed in their outer surfaces and the continuous elastic drive belt includes ribs sized to be received within the grooves. The grooves are spaced circumferentially around the drive wheel and the driven wheel to each receive a rib of the drive belt when the drive belt is slack. The apparatus may further comprise at least one idler wheel for engaging the drive belt to maintain the drive belt in contact with the drive wheel and at least one idler wheel for engaging the drive belt to maintain the drive belt in contact with the driven wheel.

In accordance with another aspect of the present invention, a method for transmitting power from a drive shaft to a driven shaft comprises the steps of: securing a fixed diameter drive wheel to the drive shaft; securing a fixed diameter driven wheel to the driven shaft; and, connecting the drive wheel to the driven wheel through an elastic drive belt. The method may further comprise the step of forming the elastic drive belt to elongate in proportion to the load applied thereto. To maintain the drive belt in contact with the drive wheel and the driven wheel, the method may further comprise the steps of: engaging the drive belt with at least one idler wheel associated with the drive wheel; and, engaging the drive belt with at least one idler wheel associated with the driven wheel.

In accordance with yet another aspect of the present invention, a method for transmitting power from a drive shaft to a driven shaft comprises the steps of: securing a fixed diameter drive wheel to the drive shaft; securing a fixed diameter driven wheel to the driven shaft; and, coupling the drive wheel and the driven wheel to one another through an element that changes length in response to differences in power/load applied to the drive shaft and the driven shaft.

In accordance with still another aspect of the present invention, a method for changing speeds during transmission of power between a drive shaft and a driven shaft comprises the steps of: securing a fixed diameter drive wheel to the drive shaft; securing a fixed diameter driven wheel to the driven shaft; and, coupling the drive wheel to the driven wheel through a drive belt which elongates in proportion to the power/load applied to the drive shaft and the driven shaft such that a shaft providing power rotates faster to accommodate the increased length of the belt and a shaft which receives power rotates slower in accordance with the unstressed length of the belt.

In accordance with an additional aspect of the present invention, a method for changing speeds during transmission of power between a drive shaft and a driven shaft comprises the steps of: securing a fixed diameter drive wheel to the drive shaft; securing a fixed diameter driven wheel to the driven shaft; coupling the drive wheel to the driven wheel through a continuous elastic drive belt having a slack length and a tensioned length, the tensioned length being proportional to power/load applied to the drive shaft and the driven shaft; receiving the elastic drive belt in a tensioned state by the drive wheel to rotate the drive wheel at a first speed defined by movement of the drive wheel to take-up the elastic drive belt in the tensioned state; and, receiving the elastic drive belt in a slack state by the driven wheel to rotate the driven wheel at a second speed defined by movement of the driven wheel to take-up the elastic drive belt in the slack state, the second speed being less than the first speed.

It is, thus, an object of the present invention to provide a method and apparatus for an improved speed changing automatic transmission which is simple yet highly reliable, inexpensive both in initial cost and for maintenance; and, to provide a method and apparatus for an improved speed changing automatic transmission wherein an elastic belt is used to couple a drive wheel to a driven wheel.

Other objects and advantages of the invention will be apparent from the following description, the accompanying drawings and the appended claims.

DETAILED DESCRIPTION OF THE INVENTION

Figure 1:
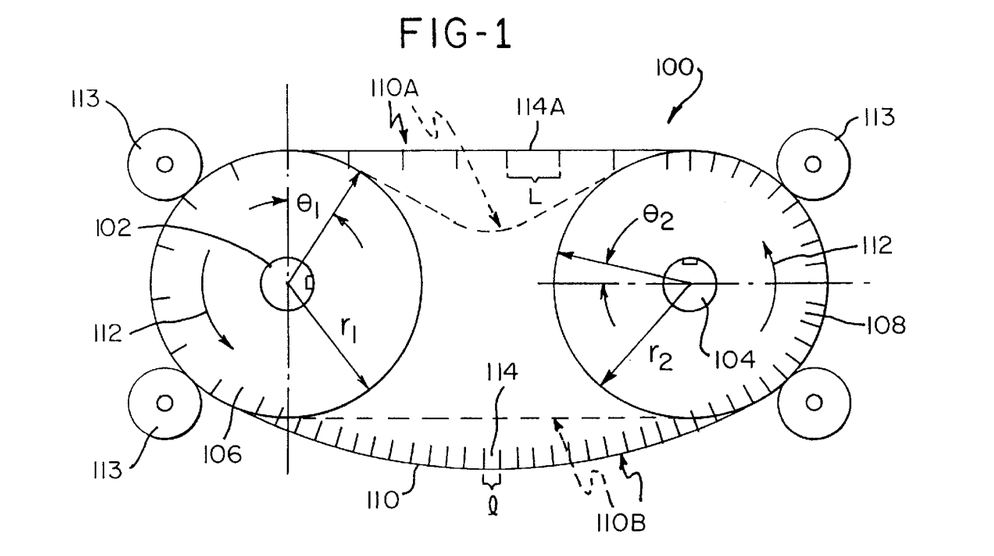
FIG. 1 is a schematic side view of apparatus operable in accordance with the present invention for changing speeds during transmission of power between a drive shaft and a driven shaft.

The invention will now be described with reference to the drawings wherein FIG. 1 schematically illustrates automatic transmission apparatus 100 for speed changing during transmission of power from a drive shaft 102 to a driven shaft 104. The apparatus 100 comprises a drive pulley or wheel 106 which is keyed, splined or otherwise affixed to the drive shaft 102. A driven pulley or wheel 108 is similarly keyed, splined or otherwise affixed to the driven shaft 104. Both the drive wheel 106 and the driven wheel 108 are of fixed diameter such that the radius ratio of the two wheels 106, 108 is predetermined. As illustrated in FIG. 1, the radius $r_1$ of the drive wheel 106 and the radius $r_2$ of the driven wheel 108 are the same size and the radius ratio is thus 1. Of course, the radii of the drive wheel 106 and the driven wheel 108 and the resulting radius ratio can be selected as required for a given application.

A continuous elastic drive belt 110 is connected around the drive wheel 106 and the driven wheel 108 to transmit power between the two wheels 106, 108. While power is normally transmitted from the drive wheel 106 to the driven wheel 108, power can be transmitted in the reverse direction, i.e., from the driven wheel 108 to the drive wheel 106. Such reverse power transmission occurs, for example, when the power provided by a power source is reduced and the inertia of a load connected to the driven wheel 108 through the driven shaft 104 is transmitted to the power source through the drive wheel 106 and the drive shaft 102 and dissipated by the power source. Such reverse power transmission is experienced, for example, when the speed of a motor vehicle is reduced by slowing the engine which is then driven by the inertia of the motor vehicle through the wheels and transmission of the motor vehicle. Another example is when the rotational direction of the drive shaft 102 is reversed for instance to back up a motor vehicle.

In either event, the elastic drive belt 110 elongates as forces are applied to the belt 110, i.e., the belt 110 is placed in tension. As shown in solid line drawing in FIG. 1, for transmission of power from the drive wheel 106 to the driven wheel 108, with the wheels 106, 108 turning in the direction of the arrows 112, the upper part 110A of the belt 110 transmits power from the drive wheel 106 to the driven wheel 108. Thus, the upper part ll0A of the belt 110 is in tension and elongates, preferably in direct proportion to the power/load within the system including the automatic transmission apparatus 100. The lower part 110B of the belt 110 does not carry the load and, therefore, it is in a state of relaxation or is slack.

Figure 2:
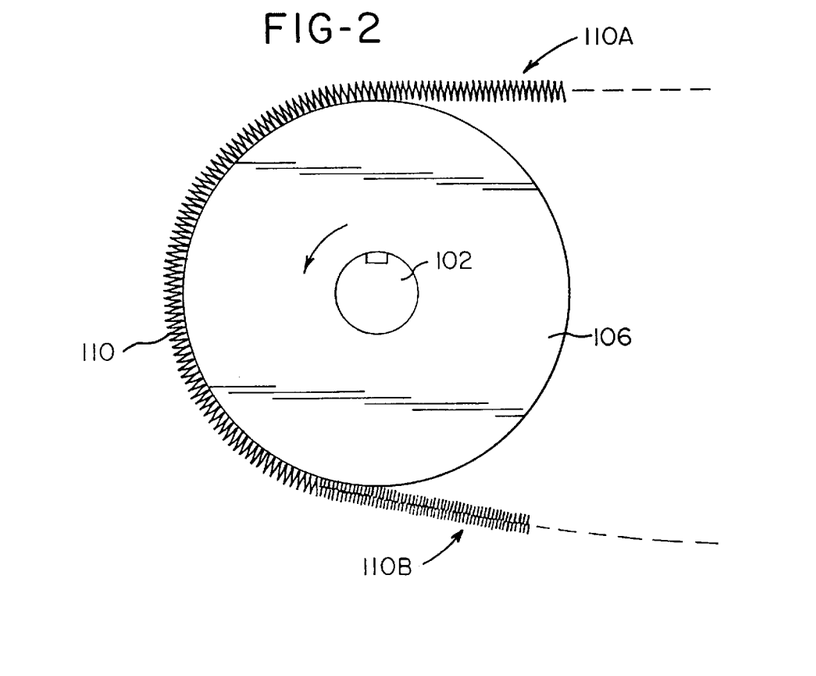
FIG. 2 is a schematic side view of a drive wheel affixed to a drive shaft illustrating an elastic drive belt tensioned prior to being and while engaged with the drive wheel and detensioned or allowed to go slack upon disengagement from the drive wheel.

The portions of the belt 110 which are in tension and slack are reversed when power is transmitted from the driven wheel 108 to the drive wheel 106 as shown by the dashed lines in FIG. 1. This is true regardless of the direction of rotation of the wheels 106, 108 as should be apparent. FIG. 2 illustrates a folded or accordion belt design placed in tension above and around the drive wheel 106 and going slack once it is disengaged from the drive wheel 106. It is noted that the elastic drive belt 110 is elastic within the entire power/load range which is possible within the driven system including the automatic transmission apparatus 100 to ensure that the belt 110 is not inelastically deformed due to an overload condition. Idler wheels 113 preferably are provided for engaging the drive belt 110 to maintain the drive belt 110 in contact with the drive wheel 106 and in contact with the driven wheel 108.

The theory of operation of the invention will now be described with further reference to FIG. 1. Assume a small segment 114 of the belt 110 in the lower part 110B has a relaxed length of 1. As the segment 114 engages and passes around the driven wheel 108, the corresponding rotation angle $\theta_2$ of the driven wheel is given by the equation:

$$\theta_2 = l/r_2$$

When there is no friction and no load on the driven wheel 108, the belt 110 is not in tension and therefore, the belt 110 segment 114 remains at a length of l. The drive wheel 106 needs only to rotate through a rotation angle $\theta_1$ which is given by the equation:

$$\theta_1 = l/r_1$$

During the no load condition, the speed ratio of the two wheels 108, 106 is:

$$\gamma = \omega_2/\omega_1 = \theta_2/\theta_1 = (l/r_1)/(l/r_2) = r_1/r_2$$

When the load on the driven wheel 108 is increased, for example when a motor vehicle goes uphill, or when the torque load on a machine is increased, more tension is applied to the elastic drive belt 110 to generate more torque to rotate the driven wheel 108. Since the wheel diameters are fixed, this tension creates elongation of the upper portion 110A of the elastic drive belt 110. The length of a corresponding segment 114A of the upper portion 110A of the belt 110 is thus increased to L which is given by the equation:

$$L = l + F/k$$

where F is the tension in the upper portion 110A of the elastic drive belt 110 and k is the spring constant of the elastic drive belt 110.

The elongated section of the belt 110, i.e., as illustrated the upper portion 110A of the belt 110, reaches the drive wheel 106 as the drive wheel 106 pulls the belt 110 toward it. The greater the elongation of the segment 114A of the belt 110, the larger the angle $\theta_1$ the drive wheel 106 has to rotate to accommodate the elongated belt segment 114A. The matching rotational angle of the drive wheel 106 is then given by the equation:

$$\theta_1 = L/r_1 = (l/r_1)(l + F/k)$$

while the matching rotational angle of the driven wheel remains the same:

$$\theta_2 = l/r_2$$

Thus, the higher the torque load applied to the driven wheel 108, the larger the tension in the upper portion 110A of the belt 110, the longer the elongated segments represented by the segment 114A and the larger the turn or rotational angle $\theta_1$ of the drive wheel 106 which is required in order to rotate the driven wheel 108 through the angle $\theta_2$ which is determined by the shorter relaxed or slack lengths of the belt segments represented by the segment 114. The speed ratio of the two wheels 106, 108 becomes:

$$\gamma = \omega_2/\omega_1 = \theta_2/\theta_1 = (l/r_2)/((l/r_1)(l+F/k)) = (r_1/r_2)(l/(l+(F/k)))$$

The elastic drive belt 110 is designed such that its elongated length, see solid line 110A, is many times the relaxed or slack length, see solid line 110B, of the belt 110, yet the belt 110 remains elastic within the entire power/load range which is possible within the driven system to ensure that the belt 110 is not inelastically deformed due to an overload condition. Since $r_1, r_2, l$ and k are design constants, the speed ratio γ is approximately inversely proportional to the tension F in the belt 110 or the torque load at the driven wheel 108, i.e.:

$$\gamma \propto l/F$$

Thus, the speed of the driven wheel 108 is adjusted according to the load, even if the drive wheel 106 maintains a constant speed. Similar speed changes occur if the power source speeds up, the power/load reverses, as described above, and generally for standard operation of a vehicle or other machine including the automatic transmission apparatus 100. As described above, the drive system of the present application does not require sophisticated sensing and control arrangements. A simple elastic belt, the drive belt 110, can take care of both sensing the torque load, and the self-adjusting or conforming of the drive system to the load as the load conditions change. The self-adjustment of the drive system is accomplished without changing the effective radii of the wheels 106, 108, and can be applied in a new type of automatic transmission for use in a wide variety of applications including bicycles, lawn and garden equipment, tractors, motorcycles, automobiles, and other machinery for effecting automatic speed changes as the load changes.

The elastic drive belt 110 should be as close to perfectly elastic as possible to prevent energy dissipation and to maintain efficiency high, close to 100% is currently believed to be possible. It is currently preferred to make the elastic drive belt 110 from spring steel; however, other materials can be used. The elastic drive belt must be designed such that it is sufficiently flexible that it can evenly engage and conform to the wheels 106, 108, provide an elastic elongation of more than 20 times its relaxed or slack length and, of course, provide sufficient strength that it can withstand power and loads experienced within the automatic transmission apparatus 100. Two belt designs will now be described which can be used in the present invention. Other designs will undoubtedly be suggested to those skilled in the art from these descriptions.

Figure 3:
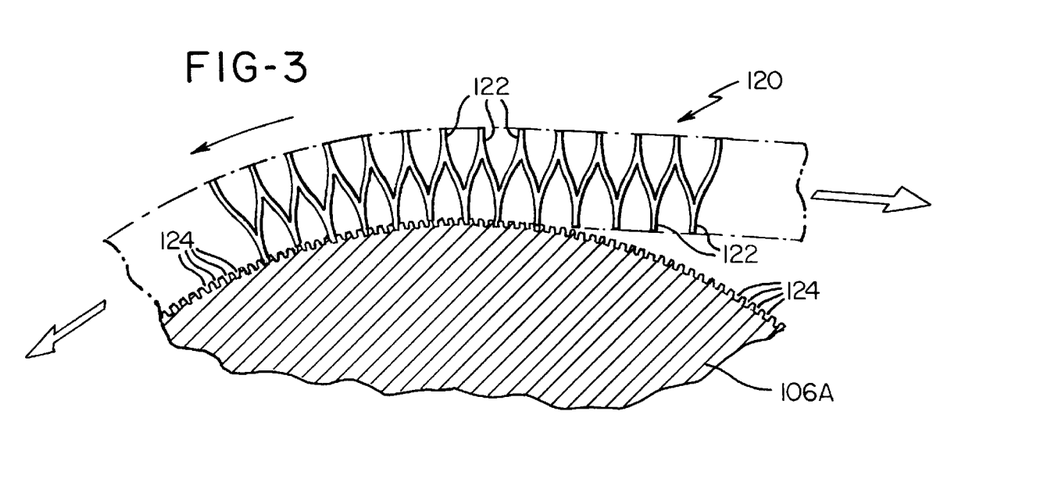
FIG. 3 schematically illustrates a portion of a drive wheel and tensioned elastic drive belt becoming engaged therewith showing axially aligned grooves on the drive wheel for receiving ribs of the elastic drive belt.
Figure 3A:
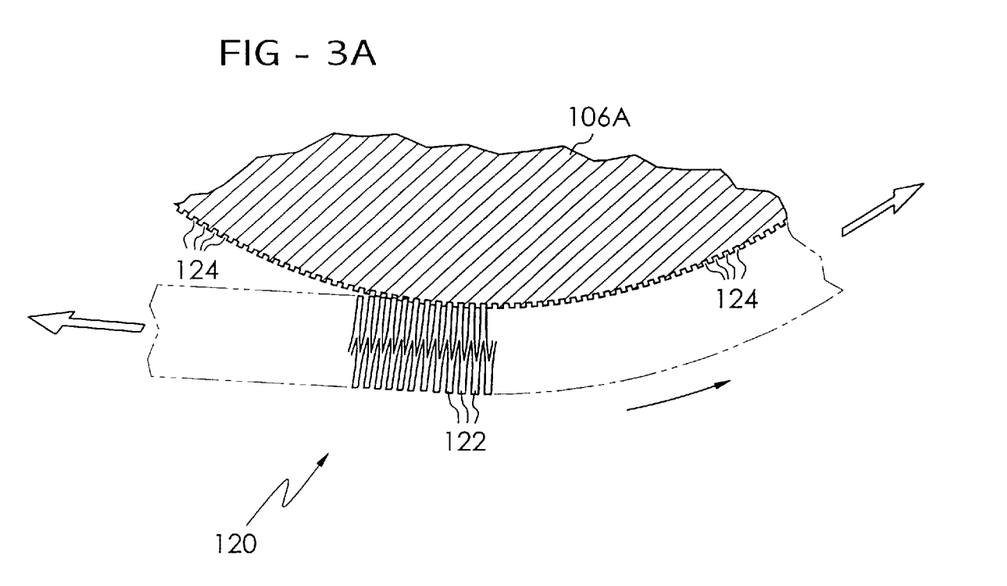
FIG. 3A schematically illustrates a portion of a driven wheel and slack elastic drive belt becoming engaged therewith showing axially aligned grooves on the drive wheel for receiving ribs of the elastic drive belt.
Figure 4:
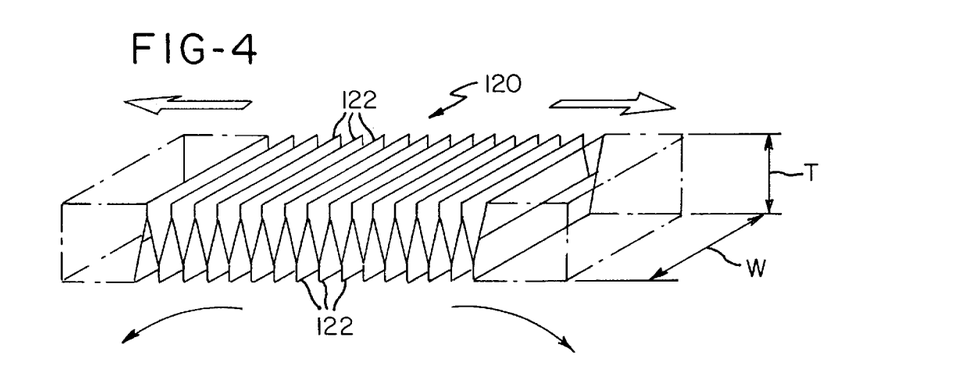
FIGS. 4 and 5 illustrated in perspective a first form of elastic drive belt which can be used in the invention of the present application and as shown in FIG. 3.
Figure 5:
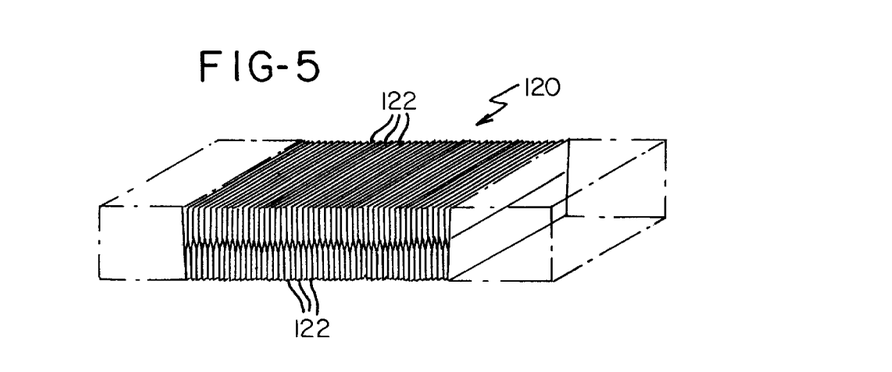

As shown in FIGS. 3 and 3A–5, a first design of an elastic drive belt 120 includes an accordion structure which is illustrated in elongation in FIGS. 3 and 4, and in relaxation or in its slack state in FIGS. 3A and 5. As shown in FIGS. 3 and 3A–5, the folds of the accordion structure terminate in tongues, teeth or flat ribs 122 which extend laterally across the elastic drive belt 120. The ribs 122 help to avoid slippage as the belt 120 is engaged with the wheels 106, 108. As illustrated in FIG. 3, a drive wheel 106A includes miniature axially aligned grooves 124 formed into its outer surface with the grooves 124 being sized to receive the ribs 122. The drive wheel and driven wheel of the automatic transmission apparatus 100, such as the drive wheel 106 and the driven wheel 108, would both have the grooves 122 formed therein. Since the drive belt 122 is elastic and flexible, an exact match between the grooves 124 and the ribs 122 is not necessary. Many grooves 124 on a wheel may be covered between adjacent ones of the ribs 122. However, preferably, the grooves 124 are spaced circumferentially around the drive wheel and the driven wheel to each receive one of the ribs 122 of the elastic drive belt 120 when the drive belt 120 is slack as shown in FIG. 3A.

Figure 6:
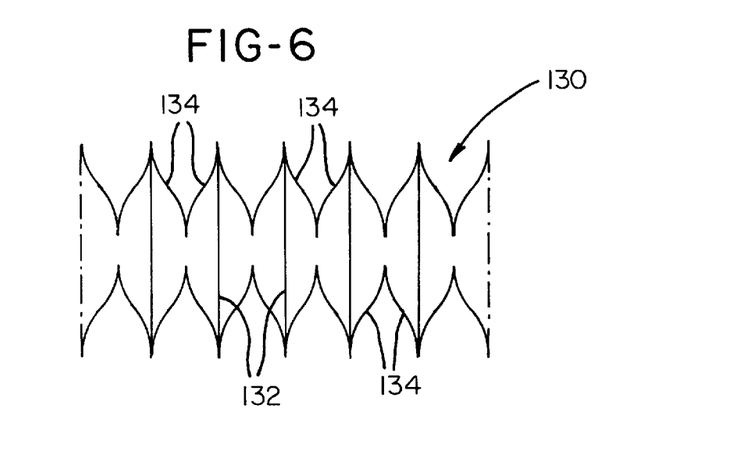
FIGS. 6 and 7 are plan and perspective views, respectively, of a second form of elastic drive belt which can be used in the invention of the present application.
Figure 7:
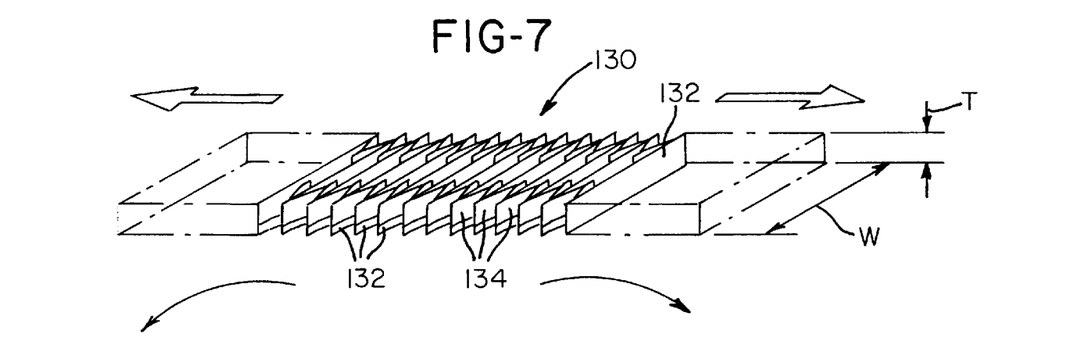

A second design of an elastic drive belt 130 is shown in FIGS. 6 and 7. The elastic drive belt 130 includes a series of ribs 132 which are interconnected at either end by accordion springs 134 which maintain the ribs 132 parallel to one another while permitting them to move away and toward one another in an elastic manner as required. As illustrated, the ribs 132 of the elastic drive belt 130 extend only beyond the accordion springs 134 on the bottom as illustrated in FIG. 7 for engagement with a drive wheel and a driven wheel. However, the ribs 132 of the elastic drive belt 130 could also extend above the accordion springs 134 if it was desired to have the ribs 132 of the drive belt 130 engage axially aligned grooves (not shown) in the idler wheels 113. The width W and thickness T of the drive belts 120, 130 are selected to provide appropriate parameters for the drive belts in a given application.

The simplicity of the automatic transmission apparatus 100 of the present application is a major advantage over prior art transmissions. The automatic transmission apparatus 100 should be less troublesome, more reliable and much cheaper to build and maintain. It also will be lighter and more compact, which will increase the efficiency of the vehicle or other equipment for which it is utilized. The automatic transmission apparatus has high efficiency, as there is no energy loss in hydraulic coupling and torque converters. Complicated hydraulic control systems and friction clutches are eliminated as are high precision and expensive gear systems. Operation is very smooth and substantially noiseless.

Reversal of the automatic transmission apparatus is easily achieved by reversing the direction of the drive wheel 106 such that the tension in the lower portion of the elastic drive belt is increased and the upper portion of the drive belt becomes slack. No special maintenance care should be needed and the automatic speed adjustments remain for reverse motion the same as for forward motion. Special arrangements are not needed for locking the transmission while a vehicle is parked since self-locking is provided, as long as the power source is engaged to the drive shaft, because the driving wheel and driven wheel are still connected by the elastic drive belt.

Most motor vehicles equipped with current-day motor vehicle automatic transmissions can not be "push-started" as can motor vehicles equipped with manual transmissions. The automatic transmission apparatus 100 of the present application allows for push starting a motor vehicle, for example when its battery is low. Operation of the transmission of the present application should be smoother than traditional automatic transmissions which change or shift the gear ratios by using hydraulically activated clutches and bands. If the gear ratio change is made too abruptly, persons in the motor vehicle are jarred and the transmission wears quickly. If the shift is made too smoothly, the friction faces of the clutches and bands are destroyed by excess heat. To reduce these problems, control of clutches and bands in conventional automatic transmissions must be precise. The automatic transmission of the present application does not present any of these problems and is particularly useful and should be important for electrical cars where easy operation, compact structure and light weight are essential. The automatic transmission of the present application is also a good choice for motorcycles or motorscooters, which require compact and easily maintained transmissions. Finally, the automatic transmission of the present application is also useful for many industrial machines including elevators, lawn mowers, tractors as well as other machines and vehicles.

Having thus described the invention of the present application in detail and by reference to preferred embodiments thereof, it will be apparent that modifications and variations are possible without departing from the scope of the invention defined in the appended claims.

What is claimed is:

1. Apparatus for transmitting power from a drive shaft to a driven shaft comprising:

a drive wheel having a fixed diameter and being affixed to a drive shaft, said drive wheel including axially aligned grooves formed in an outer surface thereof and spaced circumferentially therearound;

a driven wheel having a fixed diameter and being affixed to a driven shaft, said driven wheel including axially aligned grooves formed in an outer surface thereof and spaced circumferentially therearound; and a continuous elastic drive belt connecting said drive wheel and said driven wheel, said elastic drive belt defining ribs sized to be received within said grooves of said wheels, said ribs being spaced when said drive belt is slack so that all of said grooves of a portion of said driven wheel engaged by said drive belt are filled since said drive belt is slack when received by said driven wheel, said ribs being spaced when said drive belt is tensioned so that said ribs engage grooves of a portion of said drive wheel engaged by said drive belt which grooves are spaced from one another by at least one empty groove positioned therebetween since said drive belt is tensioned when received by said driven wheel, spacing between said ribs being maintained over said entire portions of said wheels engaged by said drive belt.

2. Apparatus for transmitting power from a drive shaft to a driven shaft as claimed in claim 1 further comprising at least one idler wheel for engaging said drive belt to maintain said drive belt in contact with said drive wheel.

3. Apparatus for transmitting power from a drive shaft to a driven shaft as claimed in claim 2 further comprising at least one idler wheel for engaging said drive belt to maintain said drive belt in contact with said driven wheel.

4. A method for transmitting power from a drive shaft to a driven shaft comprising the steps of:
   providing a fixed diameter drive wheel including axially aligned grooves formed in an outer surface thereof and spaced circumferentially therearound;
   providing a fixed diameter driven wheel including axially aligned grooves formed in an outer surface thereof and spaced circumferentially therearound
   securing said fixed diameter drive wheel to a drive shaft;
   securing said fixed diameter driven wheel to a driven shaft; and
   connecting said drive wheel to said driven wheel through an elastic drive belt, said elastic drive belt defining ribs sized to be received within said grooves of said wheels, said ribs being spaced when said drive belt is slack so that all of said grooves of a portion of said driven wheel engaged by said drive belt are filled since said drive belt is slack when received by said driven wheel, said ribs being spaced when said drive belt is tensioned so that said ribs engage grooves of a portion of said drive wheel engaged by said drive belt which grooves are spaced from one another by at least one empty groove positioned therebetween since said drive belt is tensioned when received by said driven wheel, spacing between said ribs being maintained over said entire portions of said wheels engaged by said drive belt.

5. A method for transmitting power from a drive shaft to a driven shaft as claimed in claim 4 further comprising the step of forming said elastic drive belt to elongate in proportion to a load applied thereto.

6. A method for transmitting power from a drive shaft to a driven shaft as claimed in claim 4, further comprising the step of engaging said drive belt with at least one idler wheel to maintain said drive belt in contact with said drive wheel.

7. A method for transmitting power from a drive shaft to a driven shaft as claimed in claim 6, further comprising the step of engaging said drive belt with at least one idler wheel to maintain said drive belt in contact with said driven wheel.

8. Apparatus for transmitting power from a drive shaft to a driven shaft comprising:
   a drive wheel having a fixed diameter and being affixed to a drive shaft, said drive wheel including axially aligned grooves formed in an outer surface thereof and spaced circumferentially therearound;
   a driven wheel having a fixed diameter and being affixed to a driven shaft, said driven wheel including axially aligned grooves formed in an outer surface thereof and spaced circumferentially therearound; and
   a continuous elastic drive belt connecting said drive wheel and said driven wheel, said elastic drive belt defining ribs sized to be received within said grooves of said wheels, said ribs being spaced when said drive belt is slack so that all of said grooves of a portion of said driven wheel engaged by said drive belt are filled since said drive belt is slack when received by said driven wheel, said ribs having wider spacing when said drive belt is tensioned so that said ribs engage correspondingly spaced grooves of a portion of said drive wheel engaged by said drive belt to maintain said belt tensioned while in engagement with said drive wheel, spacing between said ribs being maintained over substantially said entire portions of said drive wheel and said driven wheel engaged by said drive belt.

\* \* \* \* \*

UNITED STATES PATENT AND TRADEMARK OFFICE
CERTIFICATE OF CORRECTION

PATENT NO.   : 5,957,797
DATED        : September 28, 1999
INVENTOR(S)  : Shane Yuan Hong It is certified that error appears in the above-identified patent and that said Letters Patent is hereby corrected as shown below:

Title page, Section 73,
After "Assignee", "Wright State University, Dayton Ohio" should read
--the Trustees of Columbia University in the City of New York, New York, New York--.

Signed and Sealed this

Third Day of July, 2001

Attest:

NICHOLAS P. GODICI
Attesting Officer    Acting Director of the United States Patent and Trademark Office